US011265880B2

(12) United States Patent
Nagaraja et al.

(10) Patent No.: US 11,265,880 B2
(45) Date of Patent: Mar. 1, 2022

(54) BEAM SETS FOR CELL AND BEAM MOBILITY

(71) Applicant: QUALCOMM Incorporated, San Diego, CA (US)

(72) Inventors: Sumeeth Nagaraja, San Diego, CA (US); Tao Luo, San Diego, CA (US); Makesh Pravin John Wilson, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,390

(22) Filed: Sep. 19, 2017

(65) Prior Publication Data

US 2018/0124766 A1     May 3, 2018

Related U.S. Application Data

(60) Provisional application No. 62/417,247, filed on Nov. 3, 2016.

(51) Int. Cl.
    *H04W 72/04*          (2009.01)
    *H04W 16/28*          (2009.01)
    (Continued)

(52) U.S. Cl.
    CPC ........ *H04W 72/046* (2013.01); *H04B 7/0408* (2013.01); *H04B 7/0695* (2013.01);
    (Continued)

(58) Field of Classification Search
    CPC ............... H04W 72/046; H04W 16/28; H04W 36/0094; H04L 5/0048; H04B 7/0408; H04B 7/0695; H04B 7/0897
    See application file for complete search history.

(56) References Cited

U.S. PATENT DOCUMENTS 9,312,933 B2    4/2016   Zhang et al.
10,284,315 B2 *   5/2019   Reial .................... H04B 17/382
(Continued)

FOREIGN PATENT DOCUMENTS

CN      103004160 B    8/2016
EP        2549814 A1    1/2013
(Continued)

OTHER PUBLICATIONS

Convida Wireless: "RRC based Mobility Management in NR", 3GPP Draft; R2-167043, vol. RAN WG2, No. Kaohsiung; Oct. 9, 2016, XP051151449, Retrieved from the Internet: URL:http://www.3gpp.org/ftp/Meetings_3GPP_SYNC/RAN2/Docs/ [retrieved on Oct. 9, 2016], 2 pages.

(Continued)

*Primary Examiner* — Asad M Nawaz
*Assistant Examiner* — Kai Chang
(74) *Attorney, Agent, or Firm* — Patterson + Sheridan, LLP

(57) ABSTRACT

Certain aspects of the present disclosure provide techniques for using beam sets for mobility management. A BS serving the UE may transmit, to the UE, information regarding one or more beam sets, wherein each of the beam sets comprise one or more reference beams used to transmit a reference signal. The BS may transmit, to the UE, one or more mobility parameters, wherein the mobility parameters are associated with the reference beams and one or more mobility event triggers. The BS may receive, from the UE, an indication of a detected mobility event, the mobility event is detected based, at least in part, on the mobility parameters. The BS may take one or more actions based, at least in part, on the indication. A UE may perform corresponding steps as described herein.

28 Claims, 9 Drawing Sheets

(51) Int. Cl.
  *H04W 36/00* (2009.01)
  *H04B 7/0408* (2017.01)
  *H04B 7/06* (2006.01)
  *H04L 5/00* (2006.01)
  *H04B 7/08* (2006.01)

(52) U.S. Cl.
  CPC .......... *H04L 5/0048* (2013.01); *H04W 16/28* (2013.01); *H04W 36/0094* (2013.01); *H04B 7/0897* (2013.01)

(56) References Cited

U.S. PATENT DOCUMENTS

| | | | |
|---|---|---|---|
| 10,419,999 B2* | 9/2019 | Kim | H04W 56/001 |
| 10,505,618 B2 | 12/2019 | Guo et al. | |
| 2011/0263256 A1* | 10/2011 | Yavuz | H04W 36/0083 |
| | | | 455/436 |
| 2011/0263260 A1* | 10/2011 | Yavuz | H04W 36/0083 |
| | | | 455/437 |
| 2011/0300807 A1* | 12/2011 | Kwun | H04W 24/10 |
| | | | 455/63.1 |
| 2012/0094608 A1* | 4/2012 | Shi | H04L 1/0028 |
| | | | 455/67.11 |
| 2012/0108252 A1* | 5/2012 | Dimou | H04W 36/32 |
| | | | 455/450 |
| 2012/0282968 A1* | 11/2012 | Toskala | H04W 24/10 |
| | | | 455/517 |
| 2013/0051364 A1* | 2/2013 | Seol | H04W 16/28 |
| | | | 370/331 |
| 2013/0210422 A1* | 8/2013 | Pani | H04W 48/16 |
| | | | 455/423 |
| 2013/0244664 A1* | 9/2013 | Song | H04W 36/0083 |
| | | | 455/437 |
| 2013/0258885 A1* | 10/2013 | Yu | H04W 16/28 |
| | | | 370/252 |
| 2014/0171083 A1* | 6/2014 | Zhang | H04W 36/0061 |
| | | | 455/436 |
| 2015/0055518 A1* | 2/2015 | Park | H04B 7/2643 |
| | | | 370/280 |
| 2015/0079991 A1* | 3/2015 | Koskinen | H04W 36/0083 |
| | | | 455/436 |
| 2015/0119039 A1* | 4/2015 | Virtej | H04W 24/10 |
| | | | 455/436 |
| 2015/0156772 A1* | 6/2015 | Nishikawa | H04W 48/08 |
| | | | 370/329 |
| 2015/0181480 A1* | 6/2015 | Bulakci | H04W 36/0007 |
| | | | 455/436 |
| 2015/0257073 A1* | 9/2015 | Park | H04B 7/0408 |
| | | | 370/331 |
| 2015/0350975 A1 | 12/2015 | Won et al. | |
| 2015/0358966 A1* | 12/2015 | Zheng | H04W 72/0446 |
| | | | 370/329 |
| 2016/0043781 A1* | 2/2016 | Cho | H04B 7/0408 |
| | | | 342/373 |
| 2016/0044551 A1* | 2/2016 | Frenger | H04B 7/0617 |
| | | | 370/252 |
| 2016/0066330 A1* | 3/2016 | Centonza | H04W 72/044 |
| | | | 370/329 |
| 2016/0150435 A1* | 5/2016 | Baek | H04W 16/28 |
| | | | 370/252 |
| 2016/0157267 A1* | 6/2016 | Frenne | H04B 7/086 |
| | | | 370/329 |
| 2016/0219570 A1* | 7/2016 | Guo | H04L 5/0048 |
| 2016/0255548 A1 | 9/2016 | Cedergren et al. | |
| 2016/0302111 A1* | 10/2016 | Pu | H04W 36/0083 |
| 2016/0353424 A1* | 12/2016 | Stirling-Gallacher | H04B 7/0626 |
| 2016/0360463 A1* | 12/2016 | Kim | H04W 48/16 |
| 2016/0366621 A1 | 12/2016 | Sabapathi et al. | |
| 2017/0026938 A1 | 1/2017 | Onggosanusi et al. | |
| 2017/0055162 A1* | 2/2017 | Takano | H04W 16/28 |
| 2017/0111094 A1* | 4/2017 | Sartori | H04B 7/0617 |
| 2017/0188252 A1* | 6/2017 | Miao | H04W 36/06 |
| 2017/0195998 A1* | 7/2017 | Zhang | H04W 72/042 |
| 2017/0207843 A1* | 7/2017 | Jung | H04B 7/0632 |
| 2017/0215117 A1* | 7/2017 | Kwon | H04W 36/0094 |
| 2017/0230869 A1* | 8/2017 | Kubota | H04L 5/0048 |
| 2017/0273058 A1* | 9/2017 | Agiwal | H04B 7/0617 |
| 2017/0289932 A1* | 10/2017 | Islam | H04W 56/001 |
| 2017/0311217 A1* | 10/2017 | Jung | H04W 36/04 |
| 2017/0324459 A1* | 11/2017 | Koskela | H04B 7/0617 |
| 2017/0331602 A1* | 11/2017 | Hugl | H04L 5/0048 |
| 2018/0083722 A1* | 3/2018 | Reial | H04B 17/382 |
| 2018/0084473 A1* | 3/2018 | Nagaraja | H04W 24/04 |
| 2018/0103407 A1* | 4/2018 | Nagaraja | H04W 36/30 |
| 2019/0028170 A1 | 1/2019 | Zhang et al. | |
| 2019/0098525 A1* | 3/2019 | Hessler | H04L 1/20 |
| 2019/0158170 A1* | 5/2019 | Seo | H04J 11/00 |
| 2019/0246322 A1* | 8/2019 | Ronkainen | H04L 5/0048 |
| 2019/0268205 A1* | 8/2019 | Shin | H04L 27/2666 |
| 2019/0305838 A1* | 10/2019 | Davydov | H04B 17/318 |

FOREIGN PATENT DOCUMENTS

| | | |
|---|---|---|
| EP | 2979368 A1 | 2/2016 |
| WO | 2014130893 | 8/2014 |
| WO | 2016007295 A1 | 1/2016 |
| WO | WO-2016012844 A1 | 1/2016 |
| WO | WO-2016095984 A1 | 6/2016 |
| WO | WO-2017034607 A1 | 3/2017 |
| WO | WO-2018017840 A1 | 1/2018 |
| WO | WO-2018054459 A1 | 3/2018 |

OTHER PUBLICATIONS

International Search Report and Written Opinion—PCT/US2017/052381—ISA/EPO—dated Dec. 13, 2017.

* cited by examiner

BEAM SETS FOR CELL AND BEAM MOBILITY

CROSS-REFERENCE TO RELATED APPLICATIONS

This application claims benefit of priority from commonly-owned U.S. Provisional Application Ser. No. 62/417,247, filed Nov. 3, 2016, and entitled "Beam Sets for Cell and Beam Mobility," which is expressly incorporated herein by reference in its entirety.

INTRODUCTION

Aspects of the present disclosure relate to wireless communications, and more particularly, using beam sets for mobility management of a user equipment (UE).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure relate to methods and apparatus for using beam sets for mobility management of a UE. Mobility management may refer to beam mobility (e.g., a UE switching from a first active beam to a second active beam) and/or cell mobility, (e.g., a UE switching from a serving BS to a target BS).

Certain aspects of the present disclosure provide a method for wireless communication that may be performed, for example, by a BS. The method generally includes transmitting, to a user equipment (UE) served by the BS, information regarding one or more beam sets, wherein each of the beam sets comprise one or more reference beams used to transmit a reference signal, transmitting, to the UE, one or more mobility parameters, wherein the mobility parameters are associated with the reference beams and one or more mobility event triggers, receiving, from the UE, an indication of a detected mobility event, the mobility event detected based, at least in part, on the mobility parameters, and taking one or more actions based, at least in part, on the indication.

Certain aspects of the present disclosure provide an apparatus for wireless communication that may be performed, for example, by a BS. The apparatus generally includes means for transmitting, to a UE served by the BS, information regarding one or more beam sets, wherein each of the beam sets comprise one or more reference beams used to transmit a reference signal, means for transmitting, to the UE, one or more mobility parameters, wherein the mobility parameters are associated with the reference beams and one or more mobility event triggers, means for receiving, from the UE, an indication of a detected mobility event, the mobility event detected based, at least in part, on the mobility parameters, and means for taking one or more actions based, at least in part, on the indication.

Certain aspects of the present disclosure provide an apparatus for wireless communication that may be performed, for example, by a BS. The apparatus generally includes at least one processor and a memory coupled to the at least one processor. The at least one processor is configured to transmit, to a UE served by the BS, information regarding one or more beam sets, wherein each of the beam sets comprise one or more reference beams used to transmit a reference signal, transmit, to the UE, one or more mobility parameters, wherein the mobility parameters are associated with the reference beams and one or more mobility event triggers, receive, from the UE, an indication of a detected mobility event, the mobility event detected based, at least in part, on the mobility parameters, and take one or more actions based, at least in part, on the indication.

Certain aspects of the present disclosure provide a computer readable medium for wireless communication by BS having computer-executable instructions stored thereon for transmitting, to a user equipment (UE) served by the BS, information regarding one or more beam sets, wherein each of the beam sets comprise one or more reference beams used to transmit a reference signal, transmitting, to the UE, one or more mobility parameters, wherein the mobility parameters are associated with the reference beams and one or more mobility event triggers, receiving, from the UE, an indication of a detected mobility event, the mobility event detected based, at least in part, on the mobility parameters, and taking one or more actions based, at least in part, on the indication.

Certain aspects of the present disclosure provide a method for wireless communication that may be performed, for example, by a UE. The method generally includes receiving, from a BS serving the UE, information regarding one or more beam sets, wherein each of the beam sets comprise one or more reference beams used to transmit a reference signal, receiving, from the BS, one or more mobility parameters, wherein the mobility parameters are associated with the reference beams and one or more mobility event triggers, detecting a mobility event based, at least in part, on the mobility parameters, and taking one or more actions based, at least in part, on the detected mobility event.

Certain aspects of the present disclosure provide an apparatus for wireless communication that may be performed, for example, by a UE. The apparatus generally includes means for receiving, from a BS serving the UE, information regarding one or more beam sets, wherein each of the beam sets comprise one or more reference beams used to transmit a reference signal, means for receiving, from the BS, one or more mobility parameters, wherein the mobility parameters are associated with the reference beams and one or more mobility event triggers, means for detecting a mobility event based, at least in part, on the mobility parameters, and means for taking one or more actions based, at least in part, on the detected mobility event.

Certain aspects of the present disclosure provide an apparatus for wireless communication that may be performed, for example, by a UE. The apparatus generally includes at least one processor and a memory coupled to the at least one processor. The at least one processor is configured to receive, from a BS serving the UE, information regarding one or more beam sets, wherein each of the beam sets comprise one or more reference beams used to transmit a reference signal, receive, from the BS, one or more mobility parameters, wherein the mobility parameters are associated with the reference beams and one or more mobility event triggers, detect a mobility event based, at least in part, on the mobility parameters, and take one or more actions based, at least in part, on the detected mobility event.

Certain aspects of the present disclosure provide a computer readable medium for wireless communication UE having computer-executable instructions stored thereon for receiving, from a BS serving the UE, information regarding one or more beam sets, wherein each of the beam sets comprise one or more reference beams used to transmit a reference signal, receiving, from the BS, one or more mobility parameters, wherein the mobility parameters are associated with the reference beams and one or more mobility event triggers, detecting a mobility event based, at least in part, on the mobility parameters, and taking one or more actions based, at least in part, on the detected mobility event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
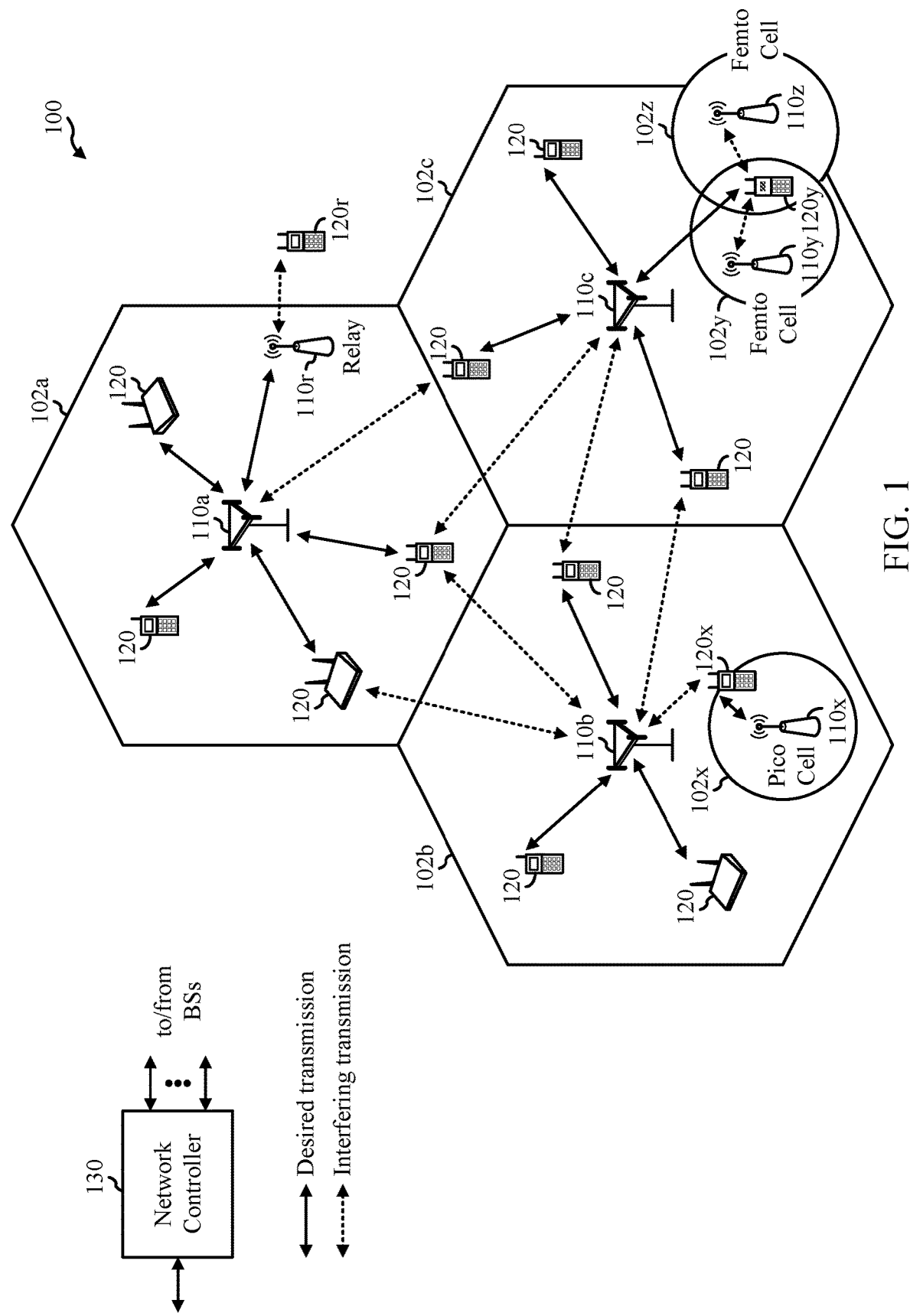
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams. As described herein, a BS may monitor active beams using measurements of reference signals (e.g., MRS, CSI-RS, synch) transmitted via reference beams.

Figure 8:
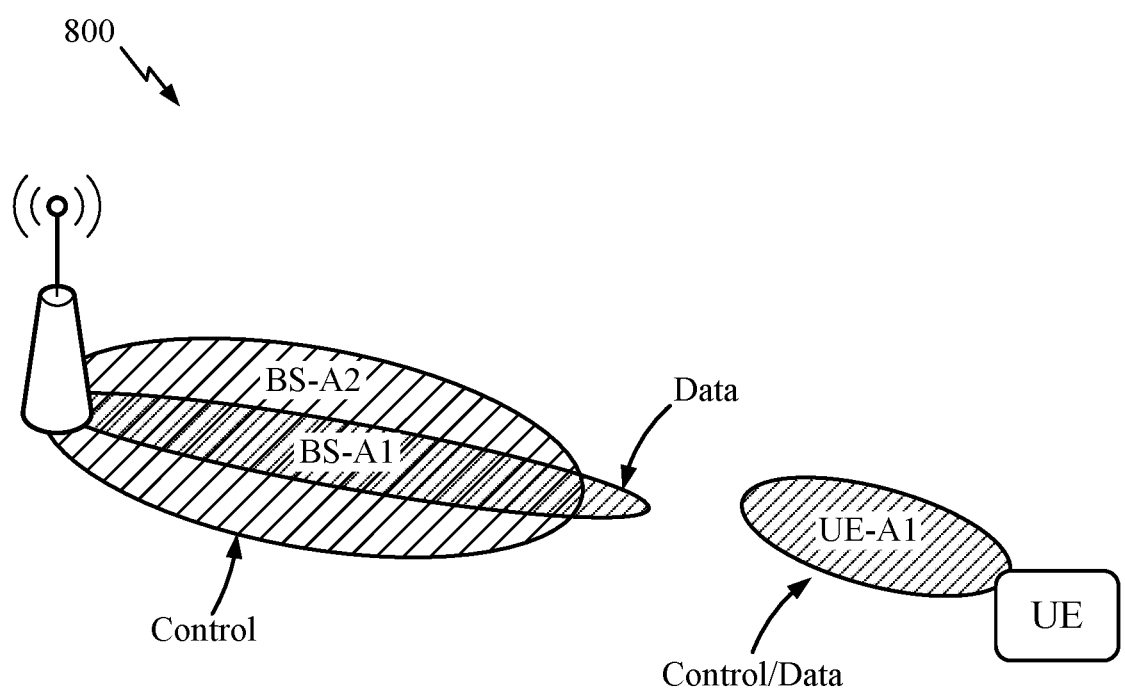
FIG. 8 illustrates an example of active beams, in accordance with certain aspects of the present disclosure.

As will be described in more detail herein, and as illustrated in FIG. 8, active beams may include control beams and data beams. Sets of active beams may have different functionalities, requirements, and characteristics. Given some of these differences, defining one set of cell mobility parameters or beam mobility parameters for a wireless system employing beams may be resource inefficient, provide inaccurate event triggers, cause unnecessary mobility of a UE. Thus, aspects of the present disclosure provide beam sets and mobility parameters associated with each beam set. The mobility parameters may be used to detect an event trigger for beam or cell mobility.

Because the functionalities and characteristics of beams may be different, aspects of the present disclosure may advantageously make mobility decisions based on parameters specific to a beam set. Accordingly, the UE report more accurate event triggers because mobility parameters may be specific to a beam set, consume less power by taking measurements associated with the mobility parameters for a beam set, and reduce signaling to a BS, by signaling event triggers associated with defined mobility parameters for a beam set.

UEs 120 may be configured to perform the operations 1000 and methods described herein for detecting a mobility events based, at least in part, on mobility parameters associated with a beam set. BS 110 may comprise a transmission reception point (TRP), Node B (NB), 5G NB, access point (AP), new radio (NR) BS, etc.). BS 110 may be configured to perform the operations 900 and methods described herein for configuring beam sets and mobility parameters associated with each of the beam sets. The BS may receive an indication of a detected mobility event based on the mobility parameters and may make a decision regarding mobility management of the UE based on the event trigger.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
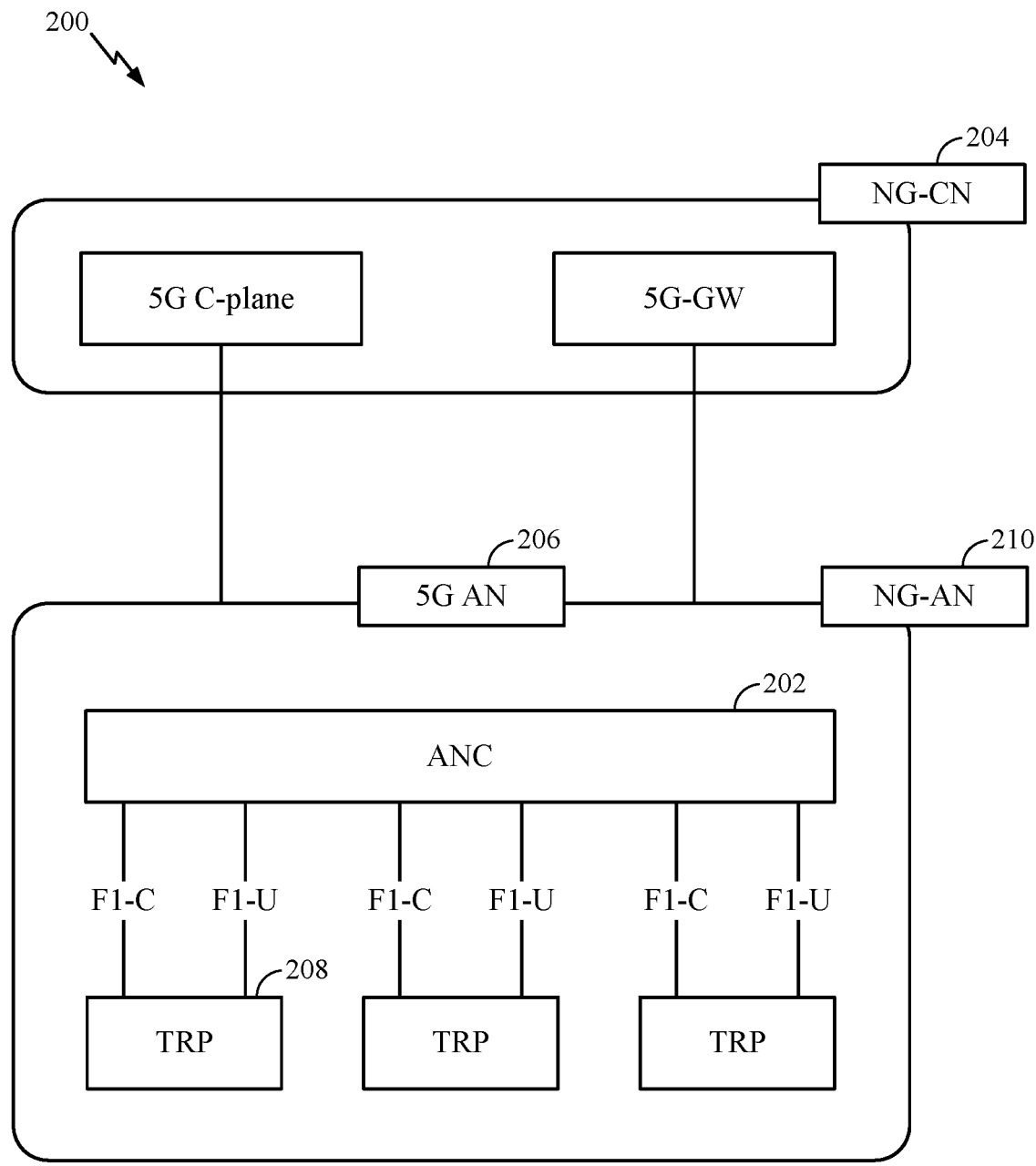
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
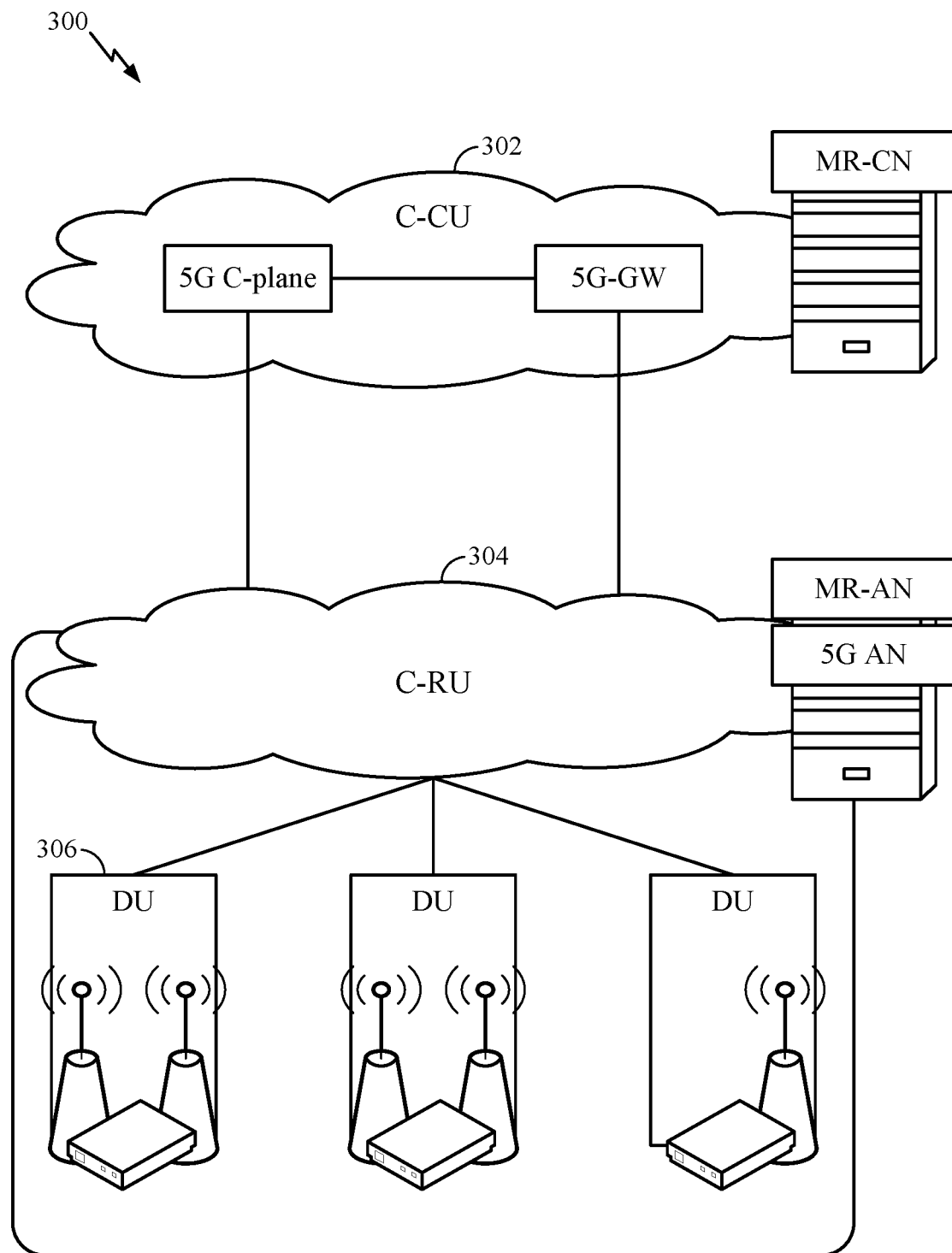
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
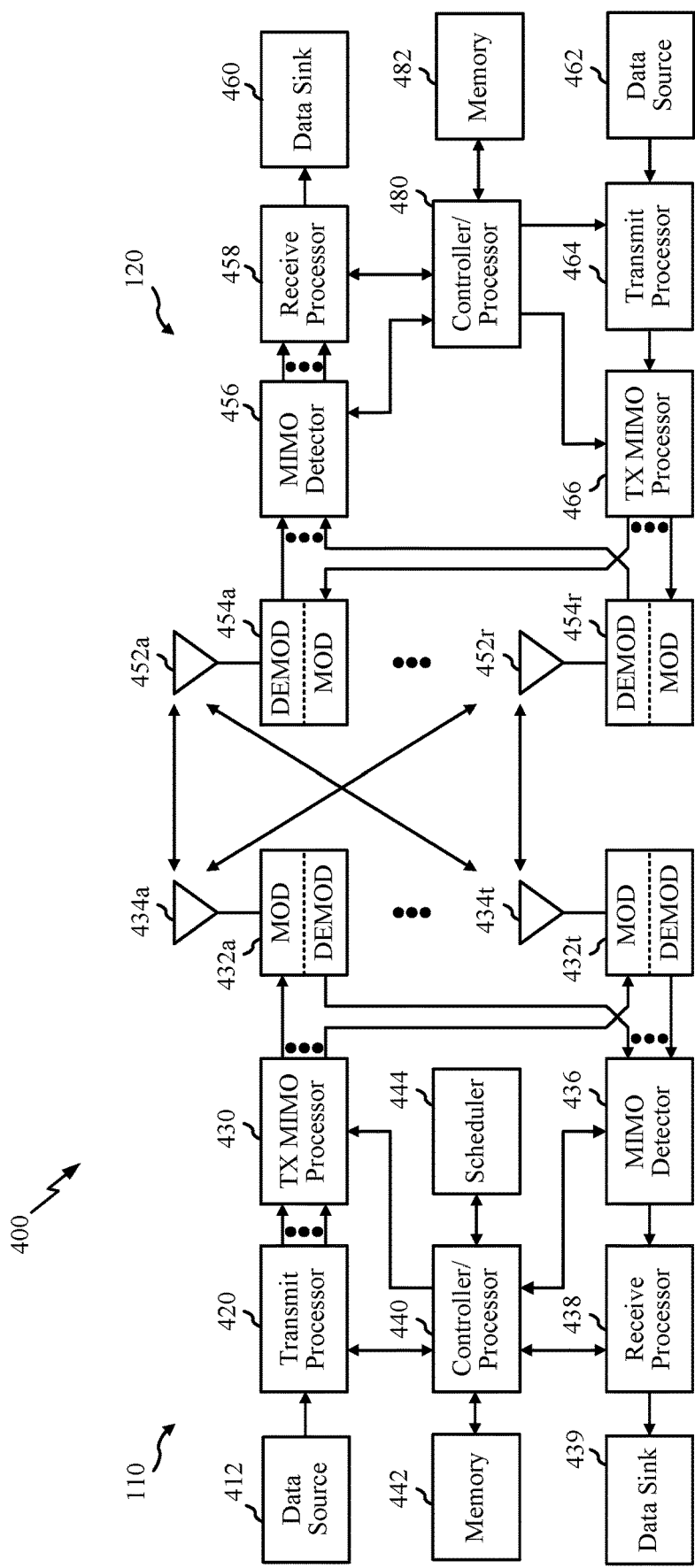
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 452, mod/demod 454, processors 466, 458, 464, and/or controller/processor 480 of the UE 120 and/or antennas 434, mod/demod 432, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UE 120 may also perform or direct, e.g., the execution of the corresponding/complementary processes for the techniques described herein and as illustrated in FIG. 10. The memories 442 and 482 may store data and program codes for the BS 110 and the UE 120, respectively. A scheduler 444 may schedule UEs for data transmission on the downlink and/or uplink.

Figure 5:
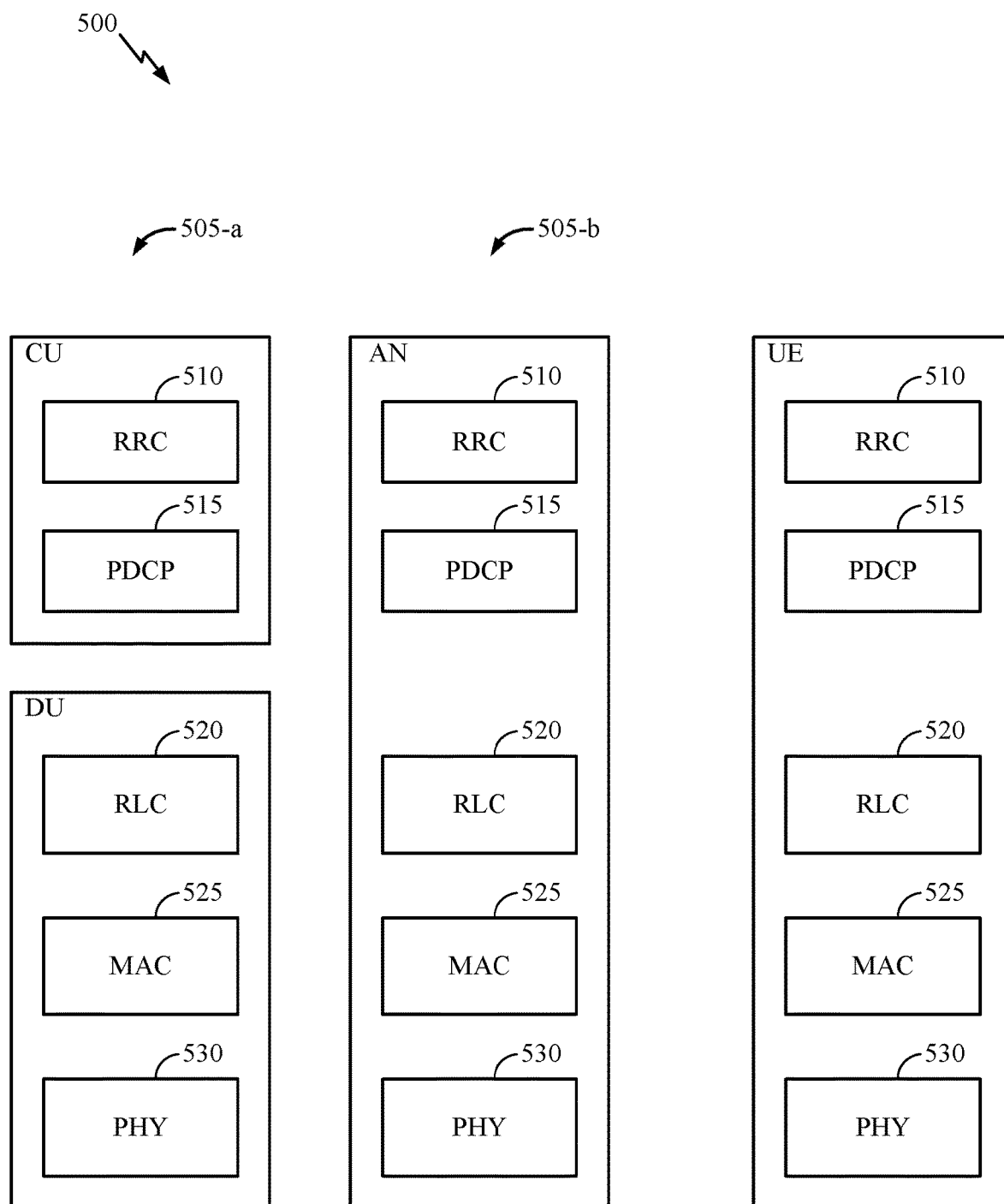
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
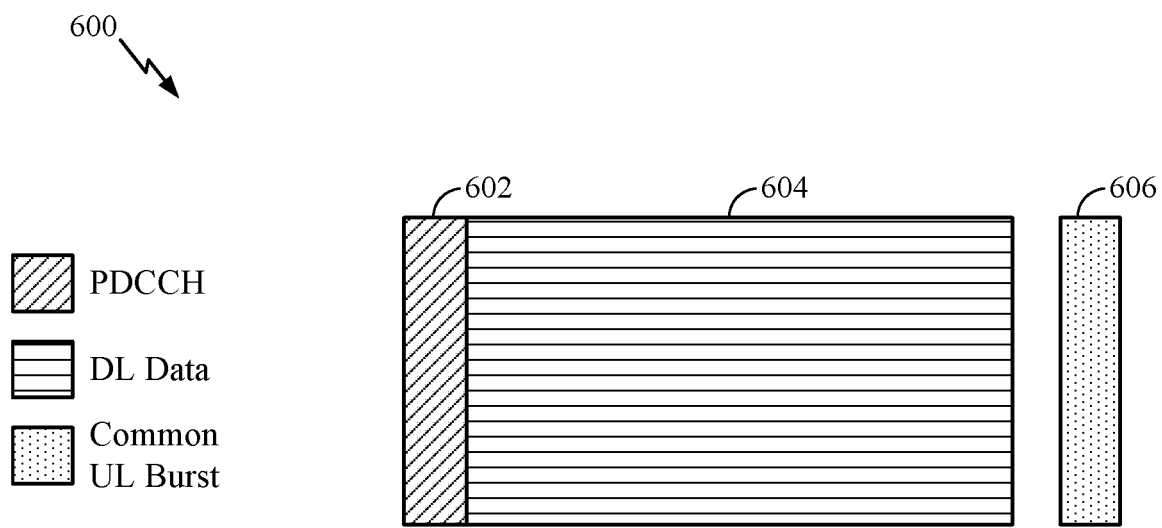
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
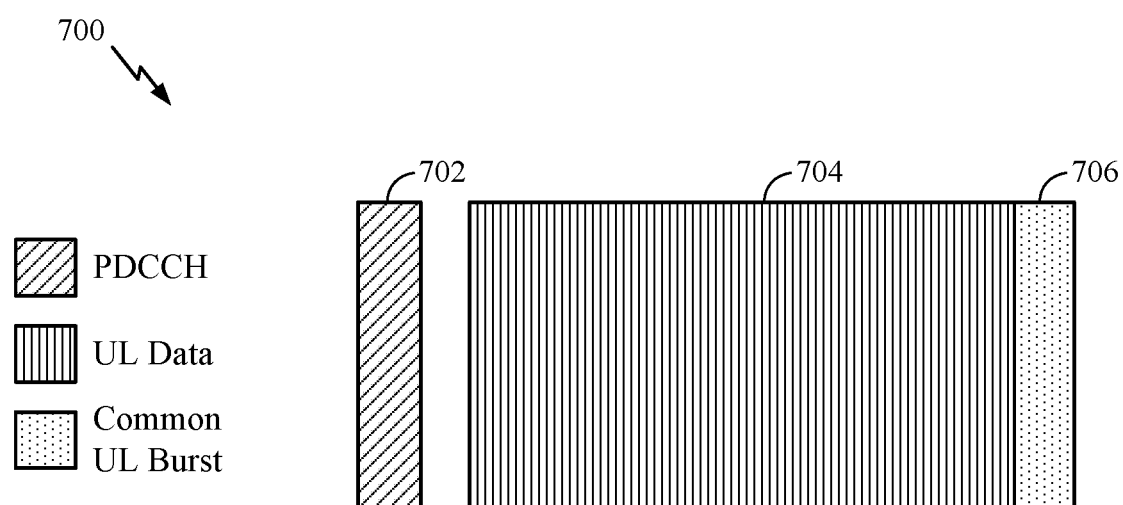
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

mmWave Systems

As used herein, the term mmWave generally refers to spectrum bands in very high frequencies such as 28 GHz. Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked. Aspects of the present disclosure may take advantage of such directional beams, for example, by using sets of beams for beam and cell mobility management.

Example Beam Sets for Cell and Beam Mobility

Some legacy wireless communication standards base UE mobility decisions on cell-specific reference signals (CRS) transmitted by serving and target BSs. For example, a CRS may be transmitted in a radio frame, a UE may measure the CRS, and the UE may report a reference signal receive power (RSRP) associated with the measured CRS to the BS. Because every cell may transmit a CRS, the measured RSRP may be "linked" to a cell. Measurements of CRS from a serving cell and one or more non-serving cells may be used to make handover decisions.

In some wireless systems, however, a serving BS may not regularly transmit a CRS. Instead, for example, a reference signal may be transmitted on-demand or as needed. Accordingly, mobility decisions in a communication system employing beams may be based on one or more reference beams as described herein.

FIG. 8 illustrates an example of active beams 800, in accordance with aspects of the present disclosure. A BS and a UE may communicate using a set of active beams. Active beams may refer to BS and UE beam pairs that are used to transmit data and control channels. A data beam may be used to transmit data and a control beam may be used to transmit control information. As illustrated in FIG. 8, data beam BS-A1 may be used to transmit DL data and control beam BS-A2 may be used to transmit DL control information. A control beam, which may serve more than one UE, may be broader than a data beam. A control/data beam UE-A1 may be used to transmit both control and data. As illustrated, both UL control and data are transmitted using a same beam; however, the data and control information may be transmitted using different beams. Similarly, data and control may be transmitted by the BS using different beams (as illustrated) or a same beam.

In wireless communication systems employing beams, such as mmWave systems, high path loss may present a challenge. Accordingly, techniques including hybrid beamforming (analog and digital), which are not present in 3G and 4G systems, may be used in such wireless systems. Hybrid beamforming creates narrow beam patterns to users (e.g., UEs), which may enhance link budget/signal to noise ratio (SRN). As described above, a BS and UE may communicate over active beams. Active beams may be referred to as serving beams. Active beams may include BS and UE beam pairs that carry data and control channels such as PDSCH, PDCCH, PUSCH, and PUCCH.

A BS may monitor beams using beam measurements and based on feedback from a UE. For example, a BS may monitor active beams using DL reference signals. A BS may transmit a DL RS, such as a measurement reference signal (MRS), channel state information reference signal (CSI-RS), a synchronization (synch) signal or a new radio reference signal (NR-synch signal (SS)).

NR defines several types of synchronization signals—NR-PSS, NR-SSS, and demodulated reference signal (DMRS) associated with PBCH. NR-PSS is defined at least for initial symbol boundary synchronization to the NR cell. NR-SSS is defined for detection of NR cell ID or at least part of NR cell ID. A UE may report, to the BS, a reference signal receive power (RSRP) associated with any received reference signal, such as those described above. In this manner, the BS may monitor active beams. Additionally or alternatively, the BS may monitor beams based on any transmitted RS.

Sets of active beams may have different functionalities, characteristics, and requirements. Stated otherwise, the functionalities of one or more active beams may be different than the functionalities other active beams. For example, a first set of active beams may include control beam and a second set of active beams may include data transmissions. As another example, beams in a first set of active beams may be transmitted in a first direction and beams in a second set of active beams may be transmitted in a second direction, different than the first direction.

During multi-link communication, a UE may simultaneously be connected to a first BS in the first direction and to a second BS in the second direction. Beam shapes for each beam set of the active beams may vary. For example, as described above, the shape of control beams from a BS may be different than a shape of data beams from the same base station.

Given the different functionalities and characteristics of beams, using one set of parameters to determine an event trigger for beam or cell mobility may be undesirable as one set of mobility parameters may not cater to the functionalities of all active beams. Using one set of parameters to determine a trigger event may trigger unnecessary mobility events (e.g., trigger an event which may not have been triggered had the UE been monitoring parameters specific to a beam set), waste power at the UE (e.g., by performing unnecessary measurements), and create excess signaling between the UE and BS (e.g., based on detected events which may not have been detected had the UE been monitoring parameters specific to a beam set).

Thus, aspects of the present disclosure provide methods and apparatus for using beam sets to assist in mobility management of a UE. Mobility management may refer to cell mobility and/or beam mobility. According to aspects, sets of beams may be configured. Each set of beams may be associated with cell or beam mobility parameters. A BS may indicate, to the UE, one or more sets of beam and mobility parameters associated with each of the beam sets. The mobility parameters may be associated with one or more mobility event triggers. The UE may take measurements and obtain signal quality. The UE may detect a mobility event based on the measurements/signal quality and the received parameters for beams in the beam set. The UE may transmit an indication of the detected mobility event to the BS. In response, the BS may handover the UE to a target BS or switch from serving the UE to a second active beam (from a first active beam).

Figure 9:
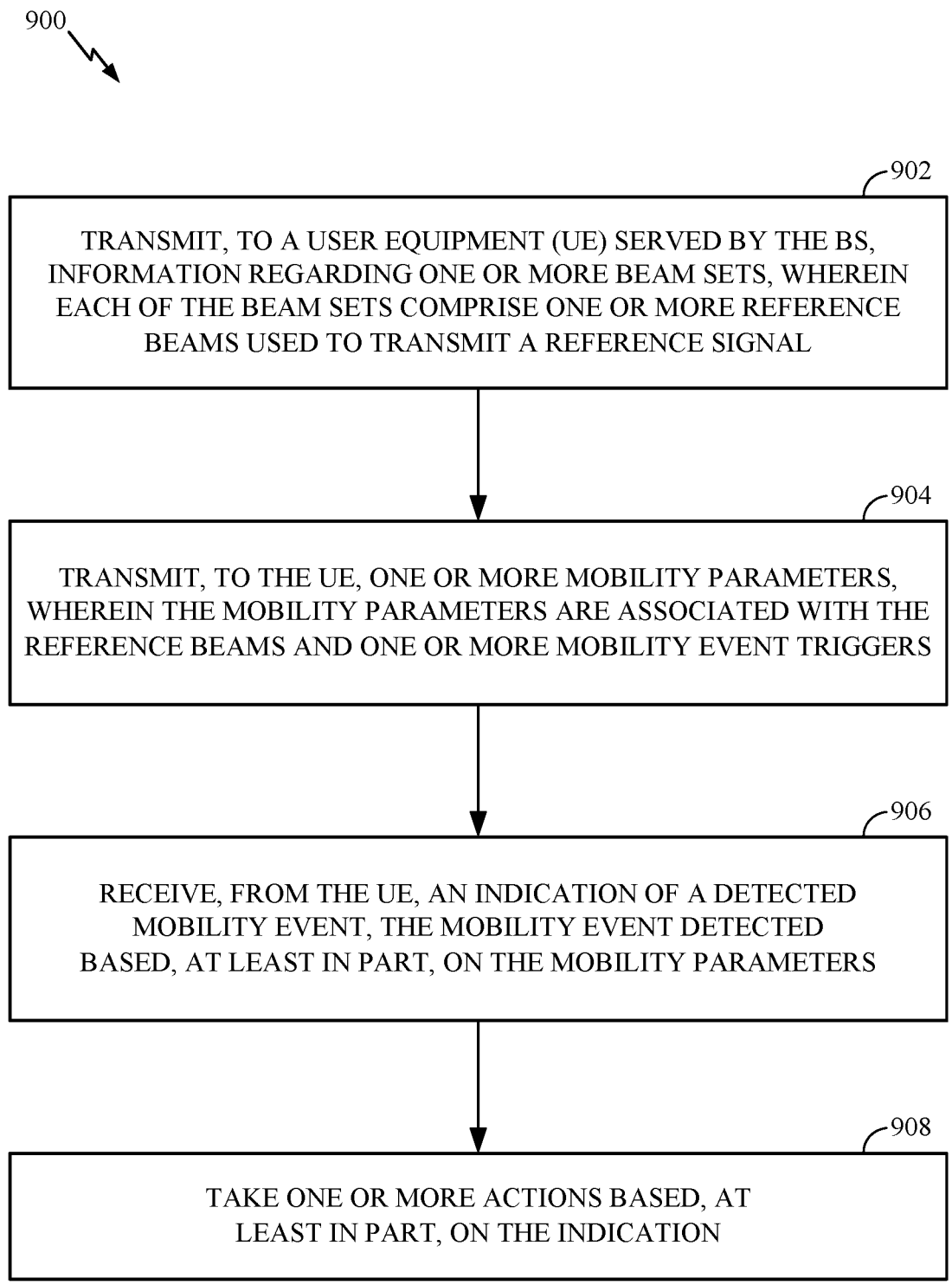
FIG. 9 example operations performed by a BS, in accordance with certain aspects of the present disclosure.
Figure 10:
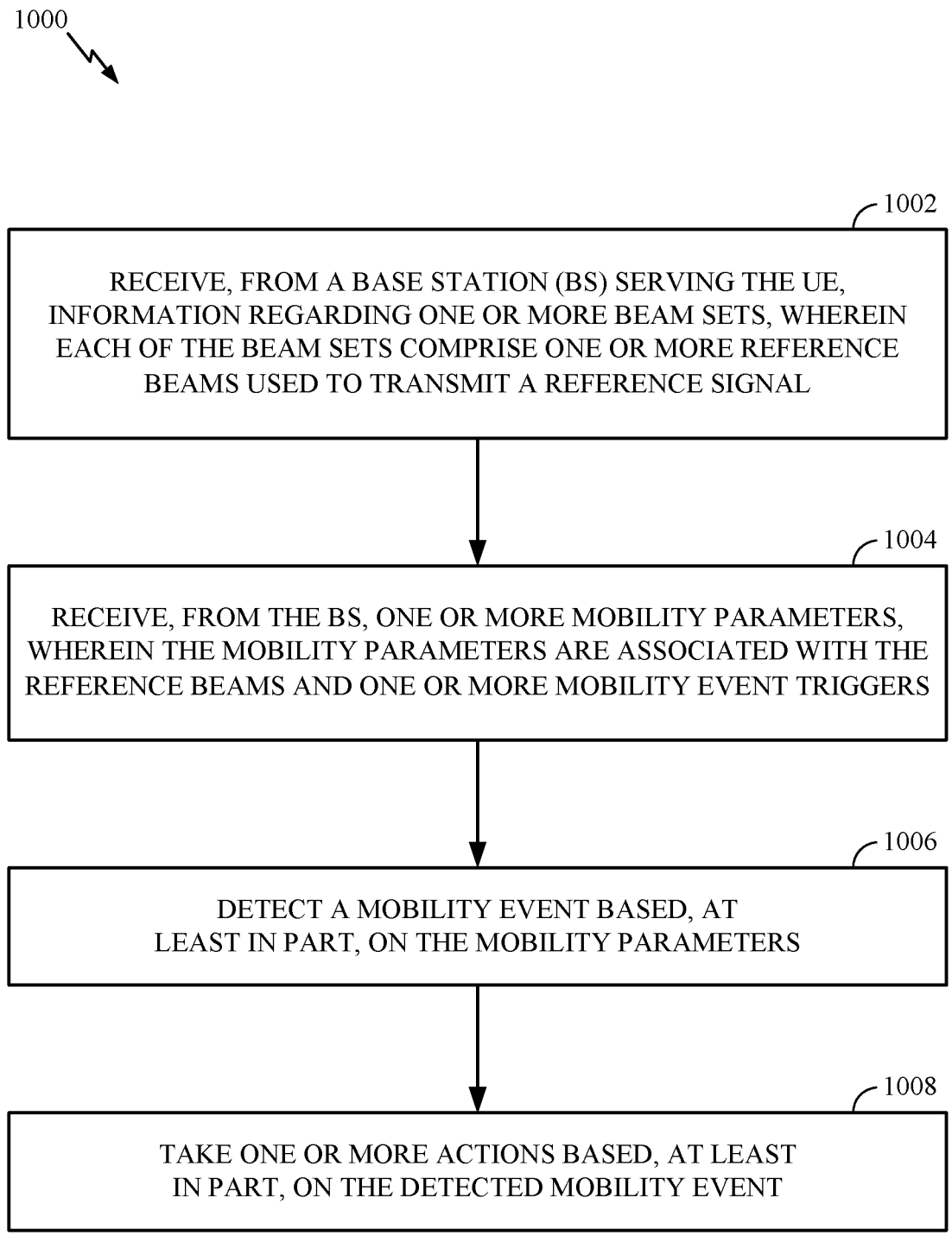
FIG. 10 illustrates example operations performed by a UE, in accordance with certain aspects of the present disclosure.

FIG. 9 illustrates example operations performed by a BS. The BS may include one or more modules of the BS 110 illustrated in FIG. 4.

At 902, the BS may transmit, to a UE served by the BS, information regarding one or more beam sets, wherein each of the beam sets comprise one or more reference beams used to transmit a reference signal. At 904, the BS may transmit, to the UE, one or more mobility parameters, wherein the mobility parameters are associated with the reference beams and one or more mobility event triggers. At 906, the BS may receive, from the UE, an indication of a detected mobility event, wherein the mobility event is detected by the UE based, at least in part, on the mobility parameters. At 908, the BS, take one or more actions based, at least in part, on the indication.

FIG. 10 illustrates example operations 1000 which may be performed by UE, according to aspects of the present disclosure. The UE may include one or more modules of the UE 120 illustrated in FIG. 4.

At 1002, the UE may receive, from a BS serving the UE, information regarding one or more beam sets, wherein each of the beam sets comprise one or more reference beams used to transmit a reference signal. At 1004, the UE may receive, from the BS, one or more mobility parameters, wherein the mobility parameters are associated with the reference beams and one or more mobility event triggers. At 1006, the UE may detect a mobility event based, at least in part, on the mobility parameters. At 1008, the UE may take one or more actions based, at least in part, on the detected mobility event.

As described herein, a beam set may include BS beams only or BS-UE beam pairs. According to aspects, the BS may signal one or more beam sets to one or more UEs. Each of the beam sets may include at least one reference beam, which is used to transmit, by the BS, at least one reference signal. Event triggers for a respective beam set may be based, at least in part, on signal quality measurements associated with the reference beam of the beam set. Accordingly, event triggers may be based on reference beams belonging to the beam set and one or more mobility parameters associated with each beam set. In this manner, mobility parameters may be specific to a beam set, thereby enabling more efficient event detection and beam/cell mobility decisions.

The mobility parameters may include one or more beam IDs of beams included in a beam set. The beam IDs may indicate one or more reference beams to be measured in an effort to detect an event trigger (mobility event trigger). Mobility parameters may include filtering coefficients a UE may apply to measurements of beams within the beam set and/or how heavily the UE should filter the measurements over time. The mobility parameters may include event triggers, which will be described in more detail below. One or more event triggers may be based on a relative signal quality change within a beam set. Additionally or alternatively, one or more event triggers may be based on an absolute signal quality change within a beam set. The mobility parameters may include a reporting configuration, indicating to the UE when, how, and what information to report to the BS upon detecting an event trigger. In response to receiving an indication of a detected event trigger, the BS may handover the UE to a target BS or may switch from using a first active beam to a second active beam to serve the UE.

A BS may define one or many beam sets for a UE. Each beam set may include a collection of beams having similar functionality or characteristic. Accordingly, one or more mobility parameters specific to a beam set may be used to determine a trigger event based on the reference beams in the beam set.

The beam sets may be indicated in a synchronization subframe, such as, for example, in a primary synchronization signal (PSS)/secondary synchronization signal (SSS)/reference signal (RS). According to an example, one beam set may include a set of beams transmitted in a synchronization region.

According to an example, one or more beam sets may include beams transmitted in a non-synchronization subframe. For example, one or more beam sets may include beams transmitted in a control region and/or a data region. Such a beam set may be based on a collection of reference signals such as, for example, a measurement reference signal (MRS), channel state information reference signal (CSI-RS), and/or other RS.

Each of the beam sets may have one or more references beams. The reference beams for the beam sets may be based on beam ID indicated in sync subframe (e.g., PSS/SSS/RS) or indicated in the non-synchronization region (e.g., control and/or data). Using the received mobility parameters associated with a specific beam set, the UE may measure one or more reference beams in the beam set in an effort to detect an event trigger.

According to aspects, the reference beam may be selected on-demand and may be based on an RS, such as a MRS or NR-SS. For example, a serving BS may transmit, to a UE, a request for a measurement and then may transmit the RS. The UE may measure the RS and may transmit a report indicating the signal strength of the RS to the serving BS. The serving BS may select and configure the UE with one or more reference beams based on the received report.

The signaling between BS and the UE regarding the beams included in the beam set (e.g., reference beams included in the beam set) and the mobility parameters associated with a respective beam set may be transmitted via Layer 1/Layer 2 control channels, Layer 3 signaling, or a combination thereof.

As mentioned above, the BS may configure beam sets based on beam functionalities. Beam sets may include one or more reference beams having similar characteristics. According, the mobility parameters associated with the beam set may be set based on the reference beams included the beam set. In this manner, efficient and accurate mobility decisions may be made by the BS.

A UE may be configured with one or more beam sets. One or more of the beam sets may be based on the direction of a reference beam. For example, Beam Set 1 may correspond to beam direction 1 and Beam Set 2 may correspond to beam direction 2, where beam direction 1 and beam direction 2 are different. Thus, the beams associated with Beam Set 1 may share have a similar direction between the BS and the UE and the beams associated with Beam Set 2 may have a similar direction between the BS and the UE.

One or more beam sets may be based on the BS associated with the reference beams of the beam set. One beam set may correspond to beams from a first BS and another beam set may correspond to beams from a second BS. According to another example, a first beam set may include beams associated with the first BS and another beam set may include beams associated with one or more other BSs. Stated otherwise, a beam set may include beams associated with multiple cells/BSs.

One or more beam sets may be based on the information being transmitted by the reference beam. For example, one beam set may include data beams from a BS and another beam set may include control beams from the same or a different BS. As illustrated in FIG. 8, control beams may be broader than data beams. Accordingly, mobility parameters for control beams may be different than mobility parameters for data beams.

The above paragraphs provide examples of beam sets that may be configured by a BS for a UE to monitor. In general, the BS may define one or more beam sets, wherein each beam set includes at least one reference beam. According to aspects, the BS may configure only one beam set.

Mobility parameters may be associated with the beam sets. Each beam set may have different mobility parameters. According to aspects, based on the beam functionalities or characteristics, one or more beam sets may share mobility parameters.

The mobility parameters may include information a UE may use to detect a mobility event. The mobility parameters may include identification associated with one or more reference beams for each of the beam sets. Accordingly, the UE may know which beams to measure in an effort to detect mobility events. The mobility parameters may include the filtering coefficients to use while processing the measurements associated with the reference beams of the beam set. The mobility parameters may indicate events associated with the beam sets that trigger an event trigger. The mobility parameters may indicate one or more thresholds associated with the beam sets. A UE may compare signal quality measurements of one or more reference beams in the beam set with an associated threshold value to determine the presence of a mobility event. The mobility parameters may indicate a time to trigger (TTT), wherein an event trigger may be detected when the event trigger requirement is fulfilled in a given time interval. The mobility parameters may indicate a reporting configuration, indicating what information to report to the BS when a mobility event is detected by the UE.

As described above, the event trigger may be based on a relative change in signal strength of reference beams within a beam set. For example, the UE may have received an indication of N beam sets. Within one of the N beam sets, the UE may determine a signal strength of a reference beam of the beam set is less than a signal strength of another beam in the same beam set. If so, the UE may transmit an indication of a detected mobility event. In response, the BS may perform beam or cell mobility. For example, the UE may be handed over to a target BS or the BS may switch the active beam used to serve the UE.

According to an example, the mobility parameters may indicate beams IDs associated with multiple reference beams in a same beam set. The mobility parameter may indicate a threshold value for detecting a mobility event. The threshold value may be a difference in signal strength associated with the two reference beams in the beam set. Thus, when the difference in signal strength exceeds the threshold value, the UE has detected a mobility event.

According to an example, the mobility parameters may indicate a beam ID of one or more selected reference beams in a same beam set. A mobility event may be detected when a signal strength associated with another beam (not a reference beam) exceeds the signal strength associated with the one or more selected reference beams.

According to another example, the UE may measure reference beams in Beam Set 1 and reference beams in Beam Set 2. An event trigger may be detected when a relative change in signal strength between the measured beams in Beam Set 1 exceeds a threshold and/or Beam Set 2 exceeds the same or a different threshold value. As described above, the UE may transmit an indication of the detected mobility event. In response, the BS may perform beam or cell mobility for the UE.

The event trigger may be based on an absolute change in signal strength within a beam set. For example, the UE may measure reference beams in Beam Set 1 and reference beams in Beam Set 2. The UE may receive a threshold value associated with Beam Set 1 and Beam Set 2. A signal quality change with respect to a threshold configured for a respective beam set may trigger an event. For example, an event trigger may be detected based on a change (e.g., delta) in signal strength for one of the reference beams of Beam Set 1 exceeding threshold value associated with Beam Set 1. Similarly, an event trigger may be detected based on a change (e.g., delta) in signal strength for one of the reference beams of Beam Set 2 exceeding a threshold value associated with Beam Set 2. This is one example of the mobility event trigger being based on a change in signal strength of the reference beam exceeding a threshold value.

According to aspects, beam sets may include reference beams from a serving BS and one or more target (e.g., neighboring) BSs. In this case, the beams associated with different BS may have a similar direction to the UE. The UE may or may not know which beams are associated with the serving and target BSs. The beam sets may be signaled to the UE by the BS. As described above, the selection of beams for a beam set may be based on a DL RS transmitted to the UE (e.g., MRS) in a connected mode.

Upon receiving an indication of a detected event trigger, the BS may make mobility management decisions for the UE. The BS may instruct the UE to switch one or more active beams based on detected trigger events associated with one or more beam sets. According to aspects, the BS may hand over the UE to a target BS (cell to cell handover) based on detected trigger events associated with the one or more beam sets.

In scenarios where a BS may communicate with a UE using active beams, the UE and BS may benefit the use of beam sets for beam and cell mobility. Beam sets may include one or more reference beams. The reference beams of a beam set may have a common functionality. For example, the reference beams of a beam set may include only control beams, only data beams, only beams from one BS, beams associated with a similar direction. The beam sets may have associated mobility parameters. Based on the parameters associated with a beam set, the UE may perform measurements of reference beams in an effort to detect event triggers. A BS may make mobility management decisions based, at least in part, on a detected event trigger.

As described herein, one set of mobility parameters may not effectively detect trigger events for beams having different functionalities and characteristics. The use of beam sets and mobility parameters associated with a beam set may allow more accurate mobility decisions and save power at a UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. As an example, one or more of the components of the BS 110 and the UE 120 illustrated in FIG. 4 may be configured to perform means corresponding to the (method) steps described herein. For example, the antenna 434, mod/demod 432, any combination of the processors 420, 430, and 438, the and controller/processor 440 may be configured to perform means for transmitting, means for receiving, means for taking one or more actions, means for selecting, and means for performing a handover. As another example, the antenna 452, mod/demod 454, any combination of the processors 458, 464, 466, and the controller/processor 480 may be configured to perform means for receiving, means for detecting, means for taking one or more actions, means for transmitting, and means for performing a handover.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), comprising:
   transmitting, to a user equipment (UE) served by the BS, information indicating two or more beam sets, wherein:
   the two or more beam sets comprise at least a first beam set and a second beam set;
   the first beam set comprises one or more reference beams used to transmit a reference signal (RS), wherein the one or more reference beams of the first beam set comprise reference beams transmitted in a non-synchronization region of a subframe; and
   the second beam set comprises one or more reference beams used to transmit another RS, wherein the one or more reference beams of the second beam set comprise reference beams transmitted in a synchronization region of the subframe;
   transmitting, to the UE, mobility parameters, wherein:
   the mobility parameters include a first set of mobility parameters corresponding to the first beam set and a second set of mobility parameters, different from the first set of mobility parameters, corresponding to the second beam set;
   the mobility parameters are associated with one or more mobility event triggers; and
   the mobility parameters include:
   a threshold value for detecting the one or more mobility event triggers based on at least one of the one or more reference beams of the first beam set or the one or more reference beams of the second beam set;
   a reporting configuration for reporting the detected one or more mobility event triggers; and
   filtering coefficients associated with the first beam set and filtering coefficients associated with the second beam set;
   receiving, from the UE, an indication of the detected one or more mobility event triggers in accordance with the reporting configuration, the one or more mobility event triggers detected based, at least in part, on the mobility parameters and the threshold value; and
   taking one or more actions based, at least in part, on the indication.

2. The method of claim 1, wherein the one or more reference beams associated with at least one of the two or more beam sets comprise beams having a similar direction between the BS and the UE.

3. The method of claim 1, wherein the one or more reference beams of the first beam set comprises beams associated with the BS and the one or more reference beams of the second beam set comprises beams associated with a target BS.

4. The method of claim 1, wherein the one or more reference beams of least one of the two or more beam sets comprise beams associated with at least one of data beams from the BS or control beams from the BS.

5. The method of claim 1, wherein the mobility parameters further include configuration information for the one or more mobility event triggers.

6. The method of claim 1, wherein:
   the mobility parameters indicate beam identifications (IDs) associated with two of the one or more reference beams in at least one of the two or more beam sets; and
   the one or more mobility event triggers are based, at least in part, on a difference in signal strength associated with the two of the one or more reference beams exceeding the threshold value.

7. The method of claim 1, wherein:
   the mobility parameters indicate a beam identification (ID) associated with a selected reference beam of the one or more reference beams in at least one beam set of the two or more beam sets; and
   the one or more mobility event triggers are based, at least in part, on a signal strength associated with another beam in the at least one beam set exceeding a signal strength associated with the selected reference beam.

8. The method of claim 1, wherein:
   the mobility parameters indicate a beam identification (ID) associated with at least one of the one or more reference beams in at least one of the two or more beam sets; and
   wherein the one or more mobility event triggers are based, at least in part, on a change in signal strength for a reference beam associated with the beam ID exceeding the threshold value.

9. The method of claim 1, further comprising:
   transmitting the RS;
   receiving, from the UE, a measurement report associated with the RS; and
   selecting the one or more reference beams in the two or more beam sets based, at least in part, on the measurement report, wherein transmitting the information regarding the two or more beam sets comprises transmitting, to the UE, an indication of the selected one or more reference beams.

10. The method of claim 1, wherein the transmitting the information regarding the two or more beam sets comprises: transmitting the information regarding via at least one of a Layer 1 control channel, Layer 2 control channel, or Layer 3 signaling.

11. The method of claim 1, wherein taking the one or more actions comprises:
performing one of a handover of the UE from the BS to a target BS or switching from a first active beam associated with the first beam set to a second active beam associated with the first beam set for serving the UE.

12. The method of claim 1, wherein the mobility parameters include a time to trigger (TTT) parameter for detecting the one or more mobility event triggers, wherein the TTT parameter specifies a time interval in which to detect the one or more mobility event triggers.

13. The method of claim 1, wherein:
the RS transmitted by the one or more reference beams for the first beam set comprises a channel state information reference signal (CSI-RS); and
the RS transmitted by the one or more reference beams for the second beam set comprises at least one of a primary synchronization signal or a secondary synchronization signal.

14. A method for wireless communication by a user equipment (UE), comprising:
receiving, from a base station (BS) serving the UE, information regarding two or more beam sets, wherein:
the two or more beam sets comprise at least a first beam set and a second beam set;
the first beam set comprises one or more reference beams used to transmit a reference signal (RS), wherein the one or more reference beams of the first beam set comprise reference beams transmitted in a non-synchronization region of a subframe; and
the second beam set comprises one or more reference beams used to transmit another RS, wherein the one or more reference beams of the second beam set comprise reference beams transmitted in a synchronization region of the subframe;
receiving, from the BS, mobility parameters, wherein:
the mobility parameters include a first set of mobility parameters corresponding to the first beam set and a second set of mobility parameters, different from the first set of mobility parameters, corresponding to the second beam set;
the mobility parameters are associated with:
one or more mobility event triggers; and
the mobility parameters include:
a threshold value for detecting the one or more mobility event triggers based on at least one of the one or more reference beams of the first beam set or the one or more reference beams of the second beam set;
a reporting configuration for reporting the detected one or more mobility event triggers; and
filtering coefficients associated with the first beam set and filtering coefficients associated with the second beam set;
detecting the one or more mobility event triggers based, at least in part, on the mobility parameters and the threshold value; and
transmitting, via a report to the BS serving the UE, an indication of the detected one or more mobility event triggers in accordance with the reporting configuration.

15. The method of claim 14, wherein the one or more reference beams associated with at least one of the two or more beam sets comprise beams have a similar direction between the BS and the UE.

16. The method of claim 14, wherein the one or more reference beams of the first beam set comprises one or more beams associated with the BS and the one or more reference beams of the second beam set comprise beams associated with a target BS.

17. The method of claim 14, wherein the one or more reference beams of least one of the two or more beam sets comprise beams associated with at least one of data beams from the BS or control beams from the BS.

18. The method of claim 14, wherein the mobility parameters further include configuration information for the one or more mobility event triggers.

19. The method of claim 14, wherein:
the mobility parameters indicate beam identifications (IDs) associated with two of the one or more reference beams in at least one of the two or more beam sets; and
detecting the one or more mobility event triggers comprises determining a difference in signal strength associated with the two of the one or more reference beams exceeds the threshold value.

20. The method of claim 14, wherein:
the mobility parameters indicate a beam identification (ID) associated with a selected reference beam in at least one beam set of the two or more beam sets; and
detecting the one or more mobility event triggers comprises determining a signal strength associated with another beam in the at least one beam set exceeds a signal strength associated with the selected reference beam.

21. The method of claim 14, wherein:
the mobility parameters indicate a beam identification (ID) associated with at least one of the one or more reference beams in at least one of the two or more beam sets; and
detecting the one or more mobility event triggers comprises determining a change in signal strength for a reference beam associated with the beam ID exceeds the threshold value.

22. The method of claim 14, further comprising:
receiving the RS from the BS; and
transmitting a measurement report associated with the RS, wherein the one or more reference beams in the two or more beam sets are based, at least in part, on the measurement report.

23. The method of claim 14, wherein receiving the information comprises:
receiving the information regarding the two or more beam sets via at least one of a Layer 1 control channel, Layer 2 control channel, or Layer 3 signaling.

24. The method of claim 14, further comprising:
after the transmitting, performing one of a handover from the BS serving the UE to a target BS or switching from a first active beam associated with the first beam set to a second active beam associated with the first beam set.

25. An apparatus for wireless communication by a base station (BS), comprising:
at least one processor configured to:
transmit, to a user equipment (UE) served by the BS, information indicating two or more beam sets, wherein:

the two or more beam sets comprise at least a first beam set and a second beam set;

the first beam set comprises one or more reference beams used to transmit a reference signal (RS), wherein the one or more reference beams of the first beam set comprise reference beams transmitted in a non-synchronization region of a subframe; and the second beam set comprises one or more reference beams used to transmit another RS, wherein the one or more reference beams of the second beam set comprise reference beams transmitted in a synchronization region of the subframe;

transmit, to the UE, mobility parameters, wherein:

the mobility parameters include a first set of mobility parameters corresponding to the first beam set and a second set of mobility parameters, different from the first set of mobility parameters, corresponding to the second beam set;

the mobility parameters are associated with:

one or more mobility event triggers; and the mobility parameters include:

a threshold value for detecting the one or more mobility event triggers based on at least one of the one or more reference beams of the first beam set or the one or more reference beams of the second beam set;

a reporting configuration for reporting the detected one or more mobility event triggers; and filtering coefficients associated with the first beam set and filtering coefficients associated with the second beam set;

receive, from the UE, an indication of the detected one or more mobility event triggers in accordance with the reporting configuration, the one or more mobility event triggers detected based, at least in part, on the mobility parameters and the threshold value; and take one or more actions based, at least in part, on the indication; and a memory coupled to the at least one processor.

26. The apparatus of claim 25, wherein the at least one processor is configured to:

transmit the RS;

receive, from the UE, a measurement report associated with the RS; and select the one or more reference beams in the two or more beam sets based, at least in part, on the measurement report, wherein the at least one processor is configured to transmit the information regarding the two or more beam sets by transmitting, to the UE, an indication of the selected one or more reference beams.

27. An apparatus for wireless communication by a user equipment (UE), comprising:

at least one processor configured to:

receive, from a base station (BS) serving the UE, information regarding two or more beam sets, wherein:

the two or more beam sets comprise at least a first beam set and a second beam set;

the first beam set comprises one or more reference beams used to transmit a reference signal (RS), wherein the one or more reference beams of the first beam set comprise reference beams transmitted in a non-synchronization region of a subframe; and the second beam set comprises one or more reference beams used to transmit another RS, wherein the one or more reference beams of the second beam set comprise reference beams transmitted in a synchronization region of the subframe;

receive, from the BS, mobility parameters, wherein:

the mobility parameters include a first set of mobility parameters corresponding to the first beam set and a second set of mobility parameters, different from the first set of mobility parameters, corresponding to the second beam set;

the mobility parameters are associated with:

one or more mobility event triggers; and the mobility parameters include:

a threshold value for detecting the one or more mobility event triggers based on at least one of the one or more reference beams of the first beam set or the one or more reference beams of the second beam set;

a reporting configuration for reporting the detected one or more mobility event triggers; and filtering coefficients associated with the first beam set and filtering coefficients associated with the second beam set;

detect the one or more mobility event triggers based, at least in part, on the mobility parameters and the threshold value; and transmit, via a report to the BS serving the UE, an indication of the detected one or more mobility event triggers in accordance with the reporting configuration; and a memory coupled to the at least one processor.

28. The apparatus of claim 27, wherein the at least one processor is configured to:

receive the RS from the BS; and transmit a measurement report associated with the RS, wherein the one or more reference beams in the two or more beam sets are based, at least in part, on the measurement report.

* * * * *